United States Patent [19]
Lee et al.

[11] Patent Number: 5,853,692
[45] Date of Patent: Dec. 29, 1998

[54] PROCESS FOR MANUFACTURING HIGH PURITY NICKEL CHLORIDE BY RECYCLING WASTE NICKEL ANODE

[75] Inventors: Jae Young Lee; Jin Gun Sohn; Seon Hwan Ahn; Myung Ho Bae, all of Pohang, Rep. of Korea

[73] Assignees: Pohang Iron & Steel Co., Ltd.; Research Institute of Industrial Science & Technology, both of Pohang, Rep. of Korea

[21] Appl. No.: 899,956

[22] Filed: Jul. 24, 1997

Related U.S. Application Data

[63] Continuation of Ser. No. 392,846, filed as PCT/KR94/00082, Jul. 1, 1994, abandoned.

[30] Foreign Application Priority Data

Jul. 2, 1993 [KR]  Rep. of Korea ................. 1993/12393

[51] Int. Cl.⁶ ................................................ C01G 53/09
[52] U.S. Cl. .................. 423/493; 423/150.1; 423/150.3; 423/150.5
[58] Field of Search ............................. 423/150.1, 493, 423/150.5, 150.3; 205/917

[56] References Cited

U.S. PATENT DOCUMENTS

| | | | |
|---|---|---|---|
| 1,044,316 | 11/1912 | Wells | 423/150.1 |
| 2,946,677 | 7/1960 | Shelton | 423/493 |
| 3,884,681 | 5/1975 | Gandon | 423/493 |
| 4,131,641 | 12/1978 | Brown et al. | 423/34 |
| 4,211,765 | 7/1980 | Meyer et al. | 423/139 |
| 4,241,031 | 12/1980 | Meyer et al. | 423/150.1 |
| 5,279,641 | 1/1994 | Narisawa et al. | 423/493 |

FOREIGN PATENT DOCUMENTS

| | | |
|---|---|---|
| 57-205326 | 12/1982 | Japan . |
| 60-180921 | 9/1985 | Japan . |
| 03291388 | 12/1991 | Japan . |
| 5-125425 | 5/1993 | Japan ................... 423/150.1 |
| 298181 | 12/1981 | U.S.S.R. ............... 423/150.1 |
| 1699932 | 12/1991 | U.S.S.R. ................ 423/493 |

OTHER PUBLICATIONS

A. R. Burkin, "Extractive Metallurgy of Nickel", *Society of Chemical Industry, Critical Reports on Applied Chemistry* vol. 17, 1987, pp. 120–146 (No Month).

*Primary Examiner*—Ngoc-Yen Nguyen
*Attorney, Agent, or Firm*—Webb Ziesenheim Bruening Logsdon Orkin & Hanson, P.C.

[57] ABSTRACT

A process for manufacturing nickel chloride is disclosed which is used as the raw material for manufacturing Zn—Ni coated steel plates, for electroless Ni plating industries, for electronic components, and for a high purity chemical additive Ni powder. That is, the invention discloses a process for manufacturing high purity nickel chloride ($NiCl_2$) by utilizing a waste nickel anode which is obtained from an electroplating factory of a steel manufacturing plant. The process for manufacturing high purity nickel chloride includes the steps of: pre-treating a waste nickel anode to remove impurities adhered on the surface thereof; working the pre-treated waste nickel anode so as to provide an increased specific surface area; putting the worked waste nickel anode into an aqueous hydrochloric acid solution of 10–35% so as for the equivalence ratios of Ni, HCl and $NiCl_2$ to be 1.0 or more, and dissolving the worked waste nickel anode at a reaction temperature of 20°–80 C. so as to form an aqueous nickel chloride solution; passing the aqueous nickel chloride solution through a filter to remove insoluble materials; injecting an oxidizing gas such as air into an impurity treating tank with the pH level maintained at 2–5 so as to form Fe and Cr ions into a sludge, and carrying out a filtering; and adding an Ni powder in the amount of 0.1–2 g/l into the aqueous nickel chloride solution to remove heavy metal ions.

18 Claims, No Drawings

PROCESS FOR MANUFACTURING HIGH PURITY NICKEL CHLORIDE BY RECYCLING WASTE NICKEL ANODE

This application is a continuation of application Ser. No. 08/392,846, filed as PCT/KR94/00082, Jul. 1, 1994 now abandoned.

FIELD OF THE INVENTION

The present invention relates to a process for manufacturing nickel chloride which is used as the raw material for manufacturing Zn—Ni coated steel plate, for the electroless Ni plating industry, for electronic components, and for manufacturing a high purity chemical additive Ni powder. More specifically, the present invention relates to a process for manufacturing high purity nickel chloride ($NiCl_2$) by utilizing a waste nickel anode which is obtained from an electroplating factory of a steel manufacturing plant.

BACKGROUND OF THE INVENTION

Currently, waste nickel anodes discarded in electroplating factories are used as a Ni melting source in an electric furnace for manufacturing stainless steels. When manufacturing stainless steels, the impurity level of the Ni ingot does not affect very much the product properties. Therefore, generally, there is used a utility nickel having a purity of about 98–98.5%, which is manufactured by smelting nickel oxide, ferro-nickel (an alloy of iron-nickel) and the like. However, in a waste nickel anode obtained from an electroplating factory, various impure elements are adhered on the surface of the anode, and the anode surface is oxidized. Therefore, its apparent nickel purity is only about 98–99%, and therefore, it is classified as a low grade material so that it can be used only as a melting source for manufacturing stainless steel.

In the case where a waste nickel anode is used as a melting source for stainless steel, impurities such as Zn, Cl and the like which are adhered on the surface of the anode cause the following problems.

Zn, Cl and the like have low boiling points, and therefore, they are evaporated during the heating. Therefore, the melts are made to contain gases, with the result that the manufactured stainless steel contains tiny gas pores.

Further, as Zn, Cl and the like are harmful elements, when they come out of the melts they cause environmental pollution.

Meanwhile, nickel chloride is used as an electroplating chemical for manufacturing a Zn—Ni coated steel plate and for electroless Ni plating. Further, nickel chloride is used as a starting material for manufacturing a high purity nickel powder (as a chemical additive), and for electronic material such as nickel ferrite and the like. Generally, nickel chloride is manufactured by dissolving refined Ni ores such as nickel oxide, NiS or the like in hydrochloric acid, and by conducting a complicated process for removing the impurities. Its grade is classified in accordance with the purity. However, in order to manufacture high purity nickel chloride, a high purity raw material has to be used and a complicated impurity removing process has to be undergone, with the result that the manufacturing cost becomes high.

SUMMARY OF THE INVENTION

Therefore it is the object of the present invention to provide a process for manufacturing high purity nickel chloride, in which waste nickel anodes discarded in electroplating factories are used as the starting material, and high purity nickel chloride is manufactured without applying the complicated impurity removing process.

In achieving the above object, the process for manufacturing high purity nickel chloride according to the present invention includes the steps of: pre-treating a waste nickel anode to remove impurities adhered on the surface thereof; working the pre-treated waste nickel anode into chips so as to provide an increased specific surface area; putting the worked waste nickel anode chips into an aqueous hydrochloric acid solution of 10–35% so that the equivalence ratios of Ni, HCl and $NiCl_2$ is 1.0 or more, and dissolving the processed waste nickel anode chips at a reaction temperature of 20°–80° C. so as to form an aqueous nickel chloride solution; passing the aqueous nickel chloride solution through a filter to remove insoluble materials; injecting an oxidizing gas such as air into an impurity treating tank with the pH level maintained at 2–5 so as to form Fe and Cr ions into a sludge, and carrying out a filtering; and adding an Ni powder in the amount of 0.1 g/l or more into the aqueous nickel chloride solution to remove heavy metal ions.

In the above process, the pre-treating step can be skipped, or a heat concentrating step can be added.

DESCRIPTION OF THE PREFERRED EMBODIMENTS

Now the present invention will be described in detail.

First, a waste nickel anode which is the starting material will be described.

In an electroplating factory of a steel manufacturing plant, a cold rolled steel sheet is electroplated by using an electrolyte containing Zn and Ni ions, for the purpose of using the Zn—Ni coated steel sheet for automobiles. The Ni ions of the electrolyte are supplied from an Ni anode, and a part of them is supplied in the form of a liquid phase nickel chloride. Thus the nickel anode is the major supply source for the Ni ions, and therefore, a high purity nickel of over 99.95% is used. During the electroplating, the Ni anode and the Steel cathode have to maintain a certain distance between them. Therefore, when the Ni anode is dissolved by a certain level, the inter-electrode distance is enlarged, and therefore, the nickel anode has to be discarded after some use of it, thereby making waste nickel anodes available.

A typical waste nickel anode was inspected as to the impurity concentration on the surface and in the inner portion thereof, and the results are shown in the following table.

TABLE 1

| Portion | Fe | Zn | K | Cl | Mn | Cr | Ca | Pb |
|---|---|---|---|---|---|---|---|---|
| | | | | | | | Unit: ppm | |
| Surface | 500 | 5200 | 4100 | 1100 | 55 | 10 | Tr | Tr |
| Inner P | 200 | 10 | 1 | 25 | 20 | Tr* | Tr | Tr |

*Tr indicates an extremely small amount.

As shown in the Table 1 above, the impurities are concentrated on the surface portion which constitutes only 1–2% of the whole nickel anode. Furthermore, the other major impurities such as Zn, K, Cl and the like are those which have intruded from the Zn—Ni electrolyte.

When the waste anode in which Zn, K, Cl and the like are included is dissolved in hydrochloric acid to obtain $NiCl_2$ as the Zn—Ni electroplating material, there is no problem because Zn, K, Cl and the like act as the electroplating materials. On the other hand, when $NiCl_2$ is to be obtained for other than electroplating purpose, the impurities which are concentrated on the surface of the waste Ni anode have to be removed by applying physical or chemical methods. Then, if Ni anode is dissolved in hydrochloric acid, a high purity $NiCl_2$ can be manufactured.

The process for manufacturing nickel chloride by using a waste nickel anode according to the present invention includes a pre-treating step, a working step, a dissolving step, and an impurity removing step. These steps will be described below in detail respectively.

As described above, a surface impurity layer exists on the Ni anode after electroplating and a pre-treatment step is carried out for removing this impurity layer. The various impurities adhere on the surface of the Ni anode and to a shallow depth of about 1–2 mm, and therefore, the impurity layer can be removed by a mechanical means such as a milling machine. Further, the surface layer contains Zn, K, and Cl in the form of compounds such as $Zn(OH)_2$, $ZnCl_2.4Zn(OH)_2$, $KCl$, $ZnCl_2$, $K_2ZnCl_4$, and therefore, if an aqueous hydrochloric acid solution of 1–10% is added, the impurities can be decomposed into ions based on the following chemical formulas.

$$ZN(OH)_2 + 2HCl \rightarrow ZnCl_2 + 2H_2O \rightarrow Zn^{+2} + 2Cl^- + 2H_2O \quad (1)$$

$$ZnCl_2.4Zn(OH)_2 + 8HCl \rightarrow 5ZnCl_2 + 8H_2O \rightarrow 5Zn^{+2} + 10Cl^- + 8H_2O \quad (2)$$

$$KCl + H_2O \rightarrow K^+ + Cl^- \quad (3)$$

$$ZnCl_2 + H_2O \rightarrow Zn^{+2} + 2Cl^- \quad (4)$$

$$K_2ZnCl_4 + H_2O \rightarrow ZnCl_2 + 2KCl + H_2O \rightarrow Zn^{+2} + 4Cl^- + 2K^+ + 2H_2O \quad (5)$$

When $NiCl_2$ is prepared as a Zn—Ni plating source, if Zn, K, Cl and the like act not as impurities but as effective elements, this pre-treating step can be skipped.

Now the working step will be described.

The bulk of one waste nickel anode is very large (ingot of 80–120 kg per anode), and the specific surface area is very small. Therefore if it is made to be directly reacted with hydrochloric acid, the dissolution speed in hydrochloric acid is very low. Therefore, in order to increase the dissolution speed in hydrochloric acid, the waste anode is crushed by a mechanical means so that the waste anode is turned to a form having a large surface area. That is, it is desirable to work the waste anode into the form of metal chips. The metal chips preferably should have a size of 10 $\mu$m–5 mm, and more preferably should have a size of 50 $\mu$m–1 mm. This size is advantageous when considering the working cost and the dissolving speed. Of course, the method for increasing the specific surface area of the waste nickel anode is not limited to the mechanical crushing process. For example, the waste anode may be heated and melted, and may be spouted through a nozzle so that the metal is formed into the form of powder or ribbons, thereby reducing the size of particles to increase the specific surface area.

Now the dissolution step will be described.

The preparation of nickel chloride through the reaction of the nickel chips with hydrochloric acid can be expressed by the following formula.

$$Ni + 2HCl \rightarrow NiCl_2 + H_2 \quad (6)$$

The adding amount of Ni and the concentration of hydrochloric acid are decided in accordance with the intended concentration of $NiCl_2$. Further, in order to increase the reaction speed, it is desirable that the equivalence ratio be 1.0 or more. The more Ni chips are added and the higher the concentration of hydrochloric acid is, the more the reaction is speeded up. However, if the concentration of hydrochloric acid excessively high, free HCl remains after the reactions so as to degrade the product quality, and therefore the equivalence ratio of HCl to $NiCl_2$ should be preferably 1.0 or more, and more preferably 1.0–1.5.

The higher the reaction temperature, the faster the reaction rate. Therefore, it is desirable to raise the temperature, but the temperature range of 20°–80° C. is thought to be proper by taking into account the economy, the facility corrosion, and the workability. Further, the acid concentration is lowered in accordance with the elapsing of time, and therefore, the speed of the dissolution speed of Ni is slowed down. Therefore, the reaction tank is separated into two or more tanks, so that this dissolution step can be divided into a dissolution sub-step, a concentration sub-step, and a residue HCl removing sub-step.

The Ni dissolution speed in hydrochloric acid is related to the reaction speed, and therefore, it is closely related to the economy such as productivity and the scale of the manufacturing facility. In the method of the present invention, in order to increase the reaction speed, the solution within the reaction tank is agitated, and at the same time, oxidizing gases such as air and oxygen are injected to speed up the dissolution while the interior of the solution tank is maintained under an oxidizing atmosphere, thereby increasing the reaction speed. That is, when Ni is dissolved in hydrochloric acid, hydrogen gas is produced, and the hydrogen gas stays on the surface of the Ni, with the result that the dissolution speed of Ni is lowered. Therefore, an oxidizing gas is injected, or strong agitations are carried out, so that the hydrogen gas is quickly removed, thereby increasing the reaction speed. As another method, hydrogen peroxide, which is an oxidizing agent, is added, so that the hydrogen gas should be quickly removed. By this method, the reaction speed can be improved by 3–5 times that of the other methods.

In order to increase the concentration of $NiCl_2$ quickly, in addition to the dissolution reaction, a heating step may be carried out. After the reaction, the residue free acid can be removed by adding an alkali such as KOH to neutralize the acid. However, this method is particularly suitable, when $NiCl_2$ is used as the electroplating material. The reason is that KCl, which is produced through the neutralization reaction, is a major ingredient of an electrolyte. Further, the removal of the free acid can be carried out in such a manner that the concentrated solution is raised to a high temperature, and then, is cooled down to precipitate $NiCl_2$ in the form of powdered $NiCl_2.6H_2O$. Then the free acid is removed, thereby preparing $NiCl_2$.

Now the purifying (impurity removing) step will be described.

When Ni chips are dissolved in hydrochloric acid, insoluble materials which are not dissolved in the acid are formed into a sludge, besides the dissolved ionic ingredients. This sludge is a non-crystalline material containing Si, and this sludge has to be removed by a filter between the reaction tanks or between an impurity treating tank and the reaction tank. As shown in Table 1 above, a waste nickel anode is a high purity material, and therefore, if $NiCl_2$ is prepared by putting the waste Ni anode in a purified hydrochloric acid solution, almost no impurities are present.

Therefore, a high purity $NiCl_2$ can be manufactured without carrying out a separate impurity removing process. However, when working a waste Ni anode, impurities such as Fe and the like are intruded and, in order to further lower the concentration of impurities, it is preferable to carry out a series of processing steps. An amount of 234 g of waste Ni anode chips which had undergone the pre-treating step and the working step was dissolved in purified hydrochloric acid having a concentration of 6.5M so as to manufacture $NiCl_2$. The $NiCl_2$ solution thus manufactured was inspected as to its impurities, and the results are shown in Table 2 below. In Table 2, the unit is gram (g)/liter (l) for Ni, and mg/l, i.e., ppm for the impurities.

TABLE 2

| Elements | Ni | Fe | Zn | K | Mn | Co | Cr | Cu | Pb |
|---|---|---|---|---|---|---|---|---|---|
| Contents | 190.7 | 500 | 25 | 20 | 10 | Tr | 5 | 1 | 2 |

The $NiCl_2$ solution which has been manufactured at the dissolving step was maintained at pH 2–4, and in this state, if an oxidizing gas such as air is injected, the $Fe^{+2}$ ions form an $Fe(OH)_3$ sludge, a $\beta$-FeOOH sludge and the like. If these sludges are filtered off, the Fe ions in the solution are removed, as well as the Cr ions. The reaction temperature should be preferably 30°–80° C., and the pH level should be preferably 2–5. If the pH level is lower than the above range, it is difficult to remove the Fe ions. If the pH level is higher than the above range, the Ni ions are precipitated in the form of $Ni(OH)_2$, so that they should be removed together with the Fe series sludges and the like, thereby causing a loss of the material.

In order to further improve the purity, even tiny amounts of heavy metals ions can be removed by applying a electroless substitution method, i.e., by utilizing the differences in the ionizing trend of metals. That is, if Ni powder is put into the $NiCl_2$ solution, the heavy metal ions such as Cu, Pb, Sn and the like which are electro-chemically noble are substituted and precipitated on the surface of the Ni powder, thereby making it possible to remove them. The Ni powder added in this case should be preferably the dust Ni which is produced at the working step (the step of crushing the Ni anode into chips), so that it should be desirable in view of the cost and the reaction speed. The addition amount of the Ni powder should be preferably 0.1–2 g per liter, and after putting the Ni powder, an agitation is carried out at a temperature of 20°–80° C. Then a filtering is carried out for removing the heavy metal ions. After carrying out the impurity removing step, a heat concentration can be carried out depending on the needs, thereby forming crystallite powders of $NiCl_2.6H_2O$, $NiCl_2.4H_2O$, or $NiCl_2.2H_2O$. Or the liquid phase, as it is, can be used.

As described above, a waste nickel anode can be turned into an almost pure material with a slight treatment, and therefore, if nickel chloride is manufactured from it, a high purity nickel chloride can be obtained. Therefore, a low cost, high purity raw material can be obtained, and the complicated impurity removing steps are skipped, so that the manufacturing cost can be saved.

Further, the dissolving time is greatly shortened by crushing the Ni anode into chips and injecting an oxidizing gas, and therefore, mass-production becomes possible with a small manufacturing facility.

The present invention can be applied also to manufacturing nickel sulphate or nickel nitrate instead of nickel chloride by using sulfuric acid or nitric acid instead of hydrochloric acid.

Now the present invention will be described based on the actual examples.

EXAMPLE 1

The waste Ni anode of Table 1 which had been discarded in an electroplating factory was worked by a milling machine, and the impurity levels were inspected for different machining depths, the inspection results being shown in Table 3 below. Further, the waste nickel anode was subjected to a wet analysis for detecting variations of the impurities in the surface layer after dissolving the impurity layer of the waste Ni anode in hydrochloric acids of different concentrations.

TABLE 3

| | Impurity concentration (ppm) | | | | | | $NiCl_2$ application |
|---|---|---|---|---|---|---|---|
| Pre-treatment | Zn | K | Mn | Cr | Cu | Pb | |
| Machining depth | | | | | | | |
| 1 mm | 5200 | 4100 | 55 | 10 | Tr* | Tr | Plating |
| 2 mm | 1005 | 1200 | 55 | 5 | Tr | Tr | " |
| 3 mm | 30 | 40 | 50 | Tr | Tr | Tr | Plating & electronic |
| over 4 mm | 10 | 20 | 20 | Tr | Tr | Tr | Plating & electronic |
| Acid Concentration | | | | | | | |
| Distilled Water | 2000 | 1000 | 60 | 10 | Tr | Tr | Plating |
| C. acid 1% | 50 | 50 | 50 | Tr | Tr | Tr | Plating & electronic |
| C. acid 3% | 30 | 30 | 50 | Tr | Tr | Tr | Plating & electronic |
| C. acid 7% | 20 | 30 | 50 | Tr | Tr | Tr | Plating & electronic |

*Tr denotes an extremely small amount.

As shown in Table 3 above, the heavy metal ions such as Cr, Cu, Pb and the like can exist in the waste Ni anode in extremely small amounts. Further, Zn and K are slightly included from the Zn—Ni electrolyte. However, Zn and K are not impurities, but effective elements in the plating-aimed nickel chloride, and therefore, they are suitable as a material for Zn—Ni plating, while they are somewhat unsuitable for electronic reagent. Therefore, if $NiCl_2$ is to be used as an electronic reagents, the surface layer should be machined off by 3 mm or more, or should be treated with hydrochloric acid to remove Zn and K, before preparing $NiCl_2$.

EXAMPLE 2

The waste Ni anode of Table 1 was machined down to a depth of 4 mm, and a pre-treatment was carried out by putting it into an aqueous hydrochloric acid solution of 7%. Then the anode was worked into chips, and 234.8 g of these chips were put into 1 liter of hydrochloric acid having a concentration of 6.5M. Then they were dissolved under different dissolving conditions, and were left for 8 hours. The concentration of $NiCl_2$ was analyzed, and the results are shown in Table 4 below.

TABLE 4

| | Dissolution speed | | | | Ni ion |
|---|---|---|---|---|---|
| Dissolution | Reactn tem °C. | Agittn rpm | Oxygen | H. peroxd | Concntn g/l |
| Comparative a | 20 | 0 | x | x | 58.7 |
| Inventive 1 | 20 | 2000 | x | x | 72.8 |
| 2 | 40 | 2000 | x | x | 89.8 |
| 3 | 60 | 2000 | x | x | 108.8 |
| 4 | 20 | 3000 | x | x | 85.8 |
| 5 | 20 | 4000 | x | x | 95.4 |
| 6 | 20 | 2000 | O | x | 125.8 |

TABLE 4-continued

| Dissolution | Reactn tem °C. | Agittn rpm | Dissolution speed Oxygen | H. peroxd | Ni ion Concntn g/l |
|---|---|---|---|---|---|
| 7 | 40 | 2000 | O | x | 135.3 |
| 8 | 20 | 2000 | x | O | 185.8 |

As shown in Table 4 above, the reaction speed is promoted, as the reaction temperature is high, as the agitating speed is fast, and as an oxidizing atmosphere is provided by injecting oxygen or hydrogen peroxide.

EXAMPLE 3

The waste Ni anode of Table 1 was acid-washed with hydrochloric acid of 3% so as to remove the surface impurity, and the anode was worked by a milling machine into chips. An amount of 234 g of the Ni chips was dissolved in hydrochloric acid of 6.5M concentration, and was left for 24 hours, thereby preparing an $NiCl_2$ solution. The $NiCl_2$ solution thus manufactured was inspected as to its impurities, and the results are shown in Table 5 below. Without carrying out particular impurity treating steps besides the removal of the surface impurity layer, slight amounts of KOH were added so as to maintain different levels of pH within the range of 2–6. Then air was injected for one hour at a temperature of 40° C., then an orange colored sludge was found to be formed, and then, the sludge was filtered off, thereby removing the Fe impurity. Then, the dust Ni powder which was produced during the working step of the Ni chips was put into the $NiCl_2$ solution in the amount of 0.5 to 2 g per liter of the $NiCl_2$ solution. Then an agitation was carried out at a temperature of 40° C. for one hour, thereby removing the heavy metal ions. The impurity decreasing trend versus the treating conditions is shown in Table 5 below.

except the removal of the surface impurity layer of the Ni anode, the heavy metal ions of Cr, Pb and Cu were 10 ppm, that is, there was almost no impurity. However, the Fe ions were too high to use it as a special grade reagent. Therefore, the pH level of the inventive dissolution 1 was varied, and the result is as follows. That is, at above pH 2, the Fe and Cr ions were steeply decreased, but, at above pH 5, the Ni ions and Fe ions were coprecipitated, with the result that the Ni concentration was steeply lowered, thereby causing a loss of the material.

Meanwhile, as can be seen in the comparative dissolutions c and d and the inventive dissolutions 5 and 6, the following phenomenon occurred. That is, when a heavy metal treatment was carried out by adding the dust Ni, that is, when only the Ni dust was added, the heavy metal ions such as Cr, Pb and Cu were decreased, but the Fe ions did not decrease at all as in the case of the comparative dissolution d. In the case where the added amount of the Ni dust was extremely small as in the case of the comparative dissolution c, the heavy metal ions did not decrease significantly at all. However, when pH was maintained at 3.5, and when oxygen or air was injected together with 1 g or more of Ni dust as in the case of the inventive dissolutions 5 and 6, the heavy metal ions as well as the Fe ions were completely removed.

What is claimed is:

1. A process for manufacturing nickel chloride, comprising the steps of:
   pre-treating a waste nickel anode having a specific surface area and obtained from an electroplating factory of a steel manufacturing plant to remove impurities adhered on the surface of the waste nickel anode;
   working the pre-treated waste nickel anode into chips so as to provide an increased specific surface area;
   putting the worked waste nickel anode chips into an aqueous hydrochloric acid solution of 10–35% such that equivalence ratios of the number of equivalents of Ni inputted/number of equivalents of a target $NiCl_2$

TABLE 5

| Dissolution | Impurity treating conditions | Ni concentration Ni (g/l) | Impurity contents Fe (ppm) | Cr (ppm) | Pb (ppm) | Cu (ppm) |
|---|---|---|---|---|---|---|
| Inventive 1 | No impurity treatment except the surface removal. | 190.7 | 500 | 10 | 2 | 1 |
| Compartv a | pH = 1.5, oxygen gas 3 liter per min injected. | 190.1 | 430 | 10 | 3 | 1 |
| Inventive 2 | pH = 2.5, oxygen gas 3 liter per min injected | 189.1 | 100 | 4 | 3 | 2 |
| Inventive 3 | pH = 3.5, oxygen gas 3 liter per min injected. | 188.2 | 15 | 3 | 2 | 1 |
| Inventive 4 | pH = 4.5, oxygen gas 3 liter per min injected. | 185.2 | 8 | Tr | 2 | 1 |
| Compartv b | pH = 5.5, oxygen gas 3 liter per min injected. | 125.2 | 2 | Tr | 2 | 1 |
| Compartv c | pH = 3.5, oxygen gas 3 liter per min Ni dust 0.1 g/l injected. | 190.8 | 15 | 4 | 2 | 2 |
| Inventive 5 | pH = 3.5, oxygen gas 3 liter per min Ni dust 1 g/l injected. | 191.1 | 18 | Tr | Tr | Tr |
| Inventive 6 | pH = 3.5, air 3 liter per min Ni dust 2 g/l injected. | 191.2 | 20 | Tr | Tr | Tr |
| Compartv d | Ni dust 2 g/l injected. | 191.2 | 520 | 5 | Tr | Tr |

As shown in Table 5 above, in the case of the inventive dissolution 1 in which no particular treatment was done concentration and the number of equivalents of HCl inputted/number of equivalents of a target $NiCl_2$ concentration are 1.0 or more, and dissolving said worked waste nickel anode chips at a reaction temperature of 20°–80° C. so as to form an aqueous nickel chloride solution having the target $NiCl_2$ concentration, wherein the two equivalence ratios have the same target $NiCl_2$ concentration;

stopping the dissolving step by passing said aqueous nickel chloride solution through a filter to remove insoluble materials;

placing said aqueous nickel chloride solution in an impurity treating tank and adding an alkaline compound to adjust the pH to 2–5;

injecting an oxidizing gas into said aqueous nickel chloride solution in the impurity treating tank with the pH level maintained at 2–5 so as to form Fe and Cr ions into a sludge, and carrying out a filtering step; and adding a Ni powder in the amount of 0.1–2.0 g/l into said aqueous nickel chloride solution to remove heavy metal ions.

2. The process as claimed in claim 1, wherein the equivalence ratios are 1.0–1.5.

3. The process as claimed in claim 1, wherein the pre-treating step consists of acid-washing said waste nickel anode with an aqueous hydrochloric acid solution of 1–10 wt %.

4. The process as claimed in claim 1, wherein the pre-treating step is carried out by machining.

5. The process as claimed in claim 1, wherein said oxidizing gas is selected from the group consisting of oxygen and air.

6. The process as claimed in claim 1, wherein hydrogen peroxide is added at the dissolving step.

7. A process for manufacturing nickel chloride as a Zn—Ni electroplating material, comprising the steps of:

working a waste nickel anode having a specific surface area obtained from an electroplating factory of a steel manufacturing plant into chips so as to provide an increased specific surface area;

putting the worked waste nickel anode chips into an aqueous hydrochloric acid solution of 10–35% such that equivalence ratios of the number of equivalents of Ni inputted per liter/number of equivalents of a target $NiCl_2$ concentration and the number of equivalents of HCl inputted per liter/number of equivalents of a target $NiCl_2$ concentration are 1.0 or more, and dissolving the worked waste nickel anode chips at a reaction temperature of 20°–80° C. so as to form an aqueous nickel chloride solution having the target $NiCl_2$ concentration, wherein the two equivalence ratios have the same target $NiCl_2$ concentration;

having the target $NiCl_2$ concentration, wherein the two equivalence ratios have the same target $NiCl_2$ concentration passing said aqueous nickel chloride solution through a filter to remove insoluble materials and adding KOH to adjust the pH to 2–5;

placing said aqueous nickel chloride solution in an impurity treating tank;

injecting an oxidizing gas into said aqueous nickel chloride solution in the impurity treating tank with the pH level maintained at 2–5 so as to form Fe and Cr ions into a sludge, and carrying out a filtering step; and adding a Ni powder in the amount of 0.1–2.0 g/l into said aqueous nickel chloride solution to remove heavy metal ions.

8. The process as claimed in claim 7, wherein the equivalence ratios are 1.0–1.5.

9. A process for manufacturing nickel chloride by using a waste nickel anode, comprising the steps of:

pre-treating a waste nickel anode having a specific surface area obtained from an electroplating factory of a steel manufacturing plant to remove impurities adhered on a surface of the waste nickel anode;

working the pre-treated waste nickel anode into chips so as to provide an increased specific surface area;

putting the worked waste nickel anode chips into an aqueous hydrochloric acid solution of 10–35% such that equivalence ratios of the number of equivalents of Ni inputted per liter/number of equivalents of a target $NiCl_2$ concentration and the number of equivalents of HCl inputted per liter/number of equivalents of a target $NiCl_2$ concentration are 1.0 or more, and dissolving said worked waste nickel anode chips at a reaction temperature of 20°–80° C. so as to form an aqueous nickel chloride solution having the target $NiCl_2$ concentration, wherein the two equivalence ratios have the same target $NiCl_2$ concentration;

stopping the dissolving step by passing said aqueous nickel chloride solution through a filter to remove insoluble materials;

placing said aqueous nickel chloride solution in an impurity treating tank and adding an alkaline compound to adjust the pH to 2–5;

injecting an oxidizing gas into said aqueous nickel chloride solution in the impurity treating tank with the pH level maintained at 2–5 so as to form Fe and Cr ions into a sludge, and carrying out a filtering step;

adding a Ni powder in the amount of 0.1–2.0 g/l into said aqueous nickel chloride solution to remove heavy metal ions; and heat-concentrating said impurity treated nickel chloride into a crystalline powder.

10. The process as claimed in claim 9, wherein said crystalline powder phase includes at least one of $NiCl_2.H_2O$, $NiCl_2.4H_2O$. $NiCl_2.2H_2O$ and $NiCl_2.6H_2O$.

11. The process as claimed in claim 9, wherein the equivalence ratios are 1.0–1.5.

12. The process as claimed in claim 2, wherein hydrogen peroxide is added at the dissolving step.

13. The process as claimed in claim 3, wherein hydrogen peroxide is added at the dissolving step.

14. The process as claimed in claim 4, wherein hydrogen peroxide is added at the dissolving step.

15. The process as claimed in claim 5, wherein hydrogen peroxide is added at the dissolving step.

16. The process as claimed in claim 10, wherein the equivalence ratios are 1.0–1.5.

17. The process as claimed in claim 1, wherein the pre-treating step includes acid-washing or mechanical milling.

18. The process as claimed in claim 9, wherein the pre-treating step includes acid-washing or mechanical milling.

* * * * *

UNITED STATES PATENT AND TRADEMARK OFFICE
CERTIFICATE OF CORRECTION

PATENT NO. : 5,853,692
DATED : December 29, 1998
INVENTOR(S) : Jae Young Lee et al.

It is certified that error appears in the above-identified patent and that said Letters Patent is hereby corrected as shown below:

Title Page, under [56] References Cited, OTHER PUBLICATIONS, insert:
  --Blackburn, "Equilibrium, A Chemistry of Solutions", pp. 8-9 (1960);
  Grant & Hackh's Chemical Dictionary, Fifth Edition, QD5 #3, p. 217 (1987)--.

Title Page, [57] ABSTRACT, line 17 "20°-80 C" should read --20°-80°C--.

Column 3 Line 67 after "acid" delete --is--.

Column 4 Line 2 after "acid" insert --is--.

Column 5 Line 40 delete "putting" and insert --adding--.

Column 5 Line 44 "crystallite" should read --crystalline--.

Column 9 Lines 52-54 Claim 7 delete "having the target NiCl2 concentration, wherein the two equivalence ratios have the same target NiCl2 concentration" and insert --stopping the dissolving step by--.

UNITED STATES PATENT AND TRADEMARK OFFICE
CERTIFICATE OF CORRECTION

PATENT NO. : 5,853,692
DATED : December 29, 1998
INVENTOR(S) : Jae Young Lee, et al.

It is certified that error appears in the above-identified patent and that said Letters Patent is hereby corrected as shown below:

Column 10 Line 43 claim 10 after "$4H_2O$" delete "." and insert --,--.

Signed and Sealed this

Sixth Day of July, 1999

Q. TODD DICKINSON

*Attest:*

*Attesting Officer*     Acting Commissioner of Patents and Trademarks